United States Patent [19]
Stark

[11] Patent Number: 6,008,146
[45] Date of Patent: Dec. 28, 1999

[54] FILTER MATERIAL AND CARTRIDGE FILTERS MADE THEREFROM

[75] Inventor: Stephen K. Stark, Wilmington, Del.

[73] Assignee: Gore Enterprise Holdings, Inc., Newark, Del.

[21] Appl. No.: 08/921,897

[22] Filed: Sep. 2, 1997

[51] Int. Cl.$^6$ .............................. D02G 3/04; B01D 39/08; B01D 39/20
[52] U.S. Cl. ..................... 442/199; 428/388; 428/422; 428/370; 57/244; 57/245; 57/249; 442/189; 442/191; 442/200; 442/201; 442/202
[58] Field of Search .................... 428/370, 388, 428/422; 57/244, 245, 249; 442/189, 191, 199, 200, 201, 202

[56] References Cited

U.S. PATENT DOCUMENTS

| | | | |
|---|---|---|---|
| 3,953,566 | 4/1976 | Gore | 264/288 |
| 4,878,930 | 11/1989 | Manniso et al. | 55/493 |
| 4,985,296 | 1/1991 | Mortimer, Jr. | 428/220 |
| 5,207,812 | 5/1993 | Tronto et al. | 55/498 |
| 5,456,983 | 10/1995 | Sassa | 428/370 |
| 5,536,290 | 7/1996 | Stark et al. | 55/498 |
| 5,549,966 | 8/1996 | Sassa | 428/229 |

FOREIGN PATENT DOCUMENTS

| | | |
|---|---|---|
| 0062867 | 10/1982 | European Pat. Off. . |
| 0358222 A2 | 3/1990 | European Pat. Off. . |
| WO 94/21846 | 9/1994 | WIPO . |

*Primary Examiner*—Richard Weisberger
*Attorney, Agent, or Firm*—Carol A. Lewis White

[57] ABSTRACT

An improved composite material of high temperature and chemical resistant material and polytetrafluoroethylene (PTFE) is provided. The composite material incorporates a coherent strand of commingled filaments of fiberglass and PTFE which is far more resistant to flex, abrasion, and chemical attack than conventional materials. Preferably filaments of expanded PTFE tow yarn and filaments of PTFE are combined through a process of air-jet texturing. Fabrics made from the composite fibers are combined with thermosetting phenolic or epoxy resins to produce pleated cartridge filter elements exhibiting superior performance in high temperature and corrosive environments.

13 Claims, 5 Drawing Sheets

FILTER MATERIAL AND CARTRIDGE FILTERS MADE THEREFROM

BACKGROUND OF THE INVENTION

1. Field of the Invention

The present invention relates to improved cartridge filters and materials and methods for producing them. More particularly, the present invention relates to an improved pleated filter media and cartridge filters fabricated from improved composites of polytetrafluoroethylene (PTFE) and other high temperature and chemical resistant fibers.

2. Description of Prior Art

Fiberglass textiles are widely employed today in numerous applications. This is due to the many favorable properties of fiberglass, including relatively low cost, excellent mechanical strength, dimensional stability, good insulative properties, and excellent resistance to temperature and humidity. Among the popular present uses of fiberglass are as an architectural fabric, in the electronics industry (e.g. as a printed circuit board), as a filtration media, and as a structural composite.

Due mostly to its relatively low cost, fiberglass presently dominates the high temperature filtration market (typically defined as those filters operating at temperatures greater than 300° F.). In this regard, fiberglass often costs 33 to 95% less than some competitive synthetic textile fibers (e.g. polytetrafluoroethylene, aramids, polyphenylene sulfide, polyimides and copolyimides).

Although fiberglass performs adequately in these applications, it suffers from numerous deficiencies. Perhaps the greatest problem with fiberglass is that it is quite fragile, being easily damaged when flexed or abraded. As a result, fiberglass fabric is incapable of performing in many applications. For instance, where a cartridge or bag filter must be vigorously flexed to free filtrate and clean the filter media (e.g. in a "shaker"-type bag house filter or a pulse-jet bag house filter), a fiberglass fabric will quickly fail. Even under less demanding regenerative procedures (e.g. reverse air cleaned bags), where far less bag flex is encountered, fiberglass has relatively limited operational life.

Another deficiency of fiberglass is that it is subject to certain chemical attack. Chemicals attack the glass filaments in the textile primarily when the process gas phase goes through a dewpoint excursion. Chemical attack can also occur in the gaseous phase or when solid particulate contacts the fiberglass.

In an effort to address some of the problems of chemical attack, a number of finishes and protective coatings have been developed. Examples of such treatments include constituents of silicone oils, graphite and PTFE dispersion coatings. Although such treatments have proven relatively effective at protecting fiberglass from chemical attack, they do not improve the problem of flex failure.

Another common problem with fiberglass is that it is difficult to handle and work. By way of example, if the fiberglass is not carefully handled during weaving, the low abrasion resistance of the fiberglass often leads to friction damage to the glass fibrils. Likewise, abrasion caused by weaving equipment can result in surface imperfections (e.g. glass pills) which can cause problems in later processing. Further, even a single fold in the glass material during processing can lead to fatigue and later failure.

In light of these many problems, synthetic fibers are the fibers of choice where long filter life is needed and/or extreme operative conditions are expected. Unfortunately, the costs of synthetic fibers restrict their accepted uses. Additionally, certain synthetic fibers, while having many exceptional characteristics, are also limited in certain respects. For example, PTFE tends to have stability (creep) problems in reverse air bag houses, with tension on the bag elongating it to a point at which proper cleaning and flexure does not occur. Copolyimides and aramids hydrolyze in the presence of moisture and high temperatures. Polyphenylene sulfide oxidizes and embrittles when exposed to oxygen and high temperature.

U.S. Pat. Nos. 5,456,983 and 5,549,966 overcome many of the problems mentioned above with respect to performnance, particularly in the case of bag filter applications. These patents teach a composite fiber comprising a coherent strand of fiberglass and PTFE which is far more resistant to flex, abrasion, and chemical attack than previous fiberglass fibers. The composite fiber is preferably created by combining an expanded PTFE tow yarn and a fiberglass yam in an air-jet texturing apparatus. By so combining, the filaments of expanded PTFE become intertwined around the filaments of fiberglass so as to form a single strand of strong, flexible composite material. The material can be readily formed into a fabric with a wide range of possible uses, including as a filter media, as an architectural fabric, as a structural fabric (such as when combined with an epoxy resin), etc. It is taught in these patents that the demands of filtration require improved flex fatigue resistance in the filling direction only, and as such, the composite fibers need only be applied in that direction.

While these materials have experienced significant success in the case of bag filter applications, significant limitations still exist with respect to the performance of these materials in cartridge filter applications.

Thus, it is a purpose of the present invention to provide an improved heat and chemical resistant pleated composite material and improved filter cartridges which can withstand the rigors of pleated cartridge filtration filtering and cleaning operations.

It is another purpose of the present invention to provide an improved thermoset resin impregnated composite material with self supporting pleats that provides superior flex life and durability over existing high temperature and chemical resistant structural fabrics. Most current filters made from heat and chemical resistant fabrics require a metal support structure to hold the non-rigid fabric into a pleated form as taught by Mann1so et al in U.S. Pat. No. 4,878,930. Pleated cartridge filters made from rigid nonwoven materials offer the benefit of greater filter area and lower weight than those with metal support structures. Cartridge filters made from composite laminates of expanded PTFE and nonwoven or felt textile backings, as taught by Tronto et al in U.S. Pat. No. 5,207,812, allow open pleats, spaced with less than 7 per inch, without requiring external support structures. The open pleats maximize cleaning effectiveness by expanding and flexing during the pulse jet cleaning process; however, current rigid, high temperature materials are too brittle to withstand repeated flexing. The present invention provides such an improved pleated structural composite and improved cartridges which can withstand this flexing without cracking or breaking, and operate in high temperature and corrosive environments.

It is a further purpose of the present invention to provide an improved pleated composite material and improved cartridges which can withstand flexing of the filter media with the pleat folds being parallel to the filling direction, whereby the greatest increase in flex life and durability of the pleated filter media in a cartridge can be gained by inclusion of composite yarns of expanded PTFE and a high temperature and chemical resistant material in the warp direction or in both the warp and filling directions.

These and other purposes of the present invention will become evident from a review of the following specification.

SUMMARY OF THE INVENTION

The present invention is directed to improved filter cartridges fabricated from improved composite materials comprising polytetrafluoroethylene (PTFE) and one or more high temperature and chemical resistant materials. By using as a component of the present invention, commingled filaments of high temperature and chemical resistant materials within filaments of PTFE, composite materials may be created which have the benefits of both filament compositions. These materials can be in the form of woven or nonwoven composite textiles or fabrics which may be further formed into the novel composites and filter cartridges of the present invention.

Preferred high temperature and chemical resistant materials include those materials which are able to withstand temperatures of greater than 300° F. and are able to withstand exposure to corrosive chemicals, such as acids, alkalis, and oxidizing agents. Suitable materials include, but are not limited to glass, quartz, ceramic, carbon, polyether ether ketone, polyamide, polyimide, and polyphenylene sulfide fibers.

In a first embodiment of forming the composites of the present invention, a woven or nonwoven fabric is provided comprising composite fibers created by combining an expanded PTFE tow yarn and a heat resistant yarn comprising fiberglass in an air-jet texturing apparatus. In the case of woven textiles, the woven textile includes these composite fibers in at least the warp direction (i.e., the lengthwise threads or yarns of a textile fabric or scrim), and most preferably in both the warp direction and fill direction (i.e., the crosswise threads or yarns of a textile fabric or scrim). For the purposes of the present invention, the nonwoven felt incorporates a scrim, and the scrim contains warp and fill directions. Thus, the scrim onto which fibers are felted would include the composite expanded PTFE/high temperature and chemical resistant material in the warp or both the warp and fill directions. This woven or nonwoven composite fabric is sufficiently resistant to flex and abrasion that it can be easily pleated and handled without compromising its structural integrity. Additionally, the combination of fiberglass and expanded PTFE imparts a number of improved properties to the composite which have previously eluded some synthetic fabrics, including greater flex life, temperature, chemical and moisture resistance, greater stability and resistance to creep. Moreover, the use of the composite yarn in at least the warp direction, which is typically perpendicular to the pleat folds in a cartridge filter, and preferably in both the warp and fill directions, greatly increases the flex life and durability of the filter media. For example, when incorporated into a cartridge filter and subjected to filtering and cleaning operations, the filter media is exposed to flexural stresses in the direction perpendicular to the pleat folds, with the highest level of this flexing occurring near the ends of the cartridge where the pleats are potted. Thus, the improved filter media of the present invention provides significant performance advantages with respect to flex and durability as compared to conventional materials.

Other preferred fiber compositions which may be incorporated into the fabrics of the present invention include filaments of expanded PTFE intertwined around filaments of ceramic, quartz, or carbon. Alternatively, synthetic fibers may also be used such as those consisting of polyether ether ketone, polyamides, polyimides or polyphenylene sulfide.

The improved composite material is prepared by coating the composite fabric with a phenolic resin or epoxy resin and partially curing, or "B-staging," it by heating the fabric. The fabric is then laminated with expanded PTFE, followed by pleating and then final curing, or "C-staging," the pleated packs.

The cured pleated filter pack is formed into a cylindrical shape and the first and last pleat are joined along a seam which is adhered together using a high temperature resistant adhesive, such as for example, an RTV silicone adhesive.

The pleated filter pack is then placed around a perforated, cylindrical supporting member or tube. This center tube or core may be an expanded or perforated tube or core. The tube material may be carbon steel, galvanized or stainless steel, aluminum or any other suitable heat and/or chemical resistant material. In some cases, depending on the desired configuration of the filter cartridge, the center tube or core may be a permanent fixture of the filtration device which can be separated from the pleated filter pack. The pleated filter pack is potted into suitable end caps, such as metal end-caps fabricated from carbon steel, galvanized steel, stainless steel, aluminum or any other suitable heat and/or chemical resistant material.

The potting material may comprise a heat and/or chemical resistant silicone, epoxy or ceramic material. The potting material is typically dispensed to the end caps as a viscous liquid, and after dispensing the potting material, the pleated filter pack is set into the potting which hardens to form an air-tight seal between the end-cap and the pleated filter pack.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved filter cartridge fabricated from improved composite materials comprising polytetrafluoroethylene (PTFE) and one or more heat and/or chemical resistant materials. By commingling filaments of the heat and/or and chemical resistant materials within filaments of PTFE, a composite fiber is created which has the benefits of both component materials. These materials are then formed into fabrics of woven or nonwoven construction which may be further formed into the novel filter media and cartridges of the present invention.

Figure 2:
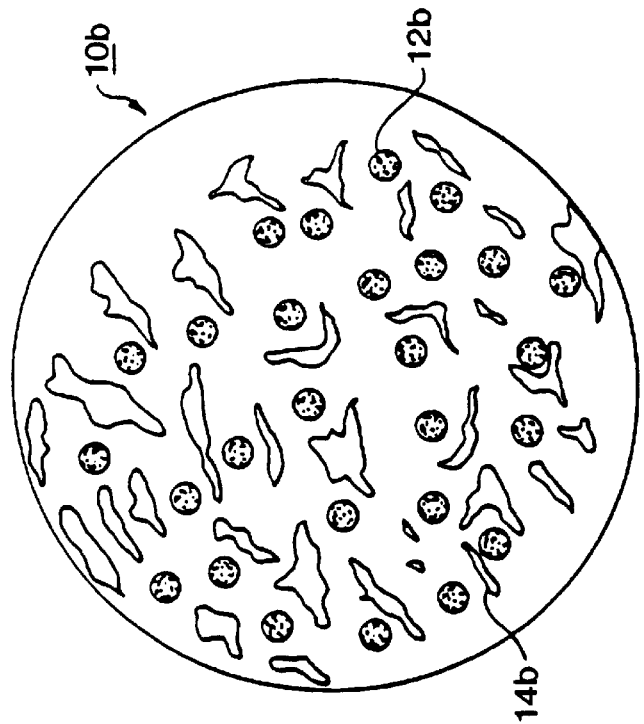
FIG. 2 is an enlarged, partial schematic cross-sectional representation of another embodiment of a fiber which may be incorporated in the present invention.
Figure 1:
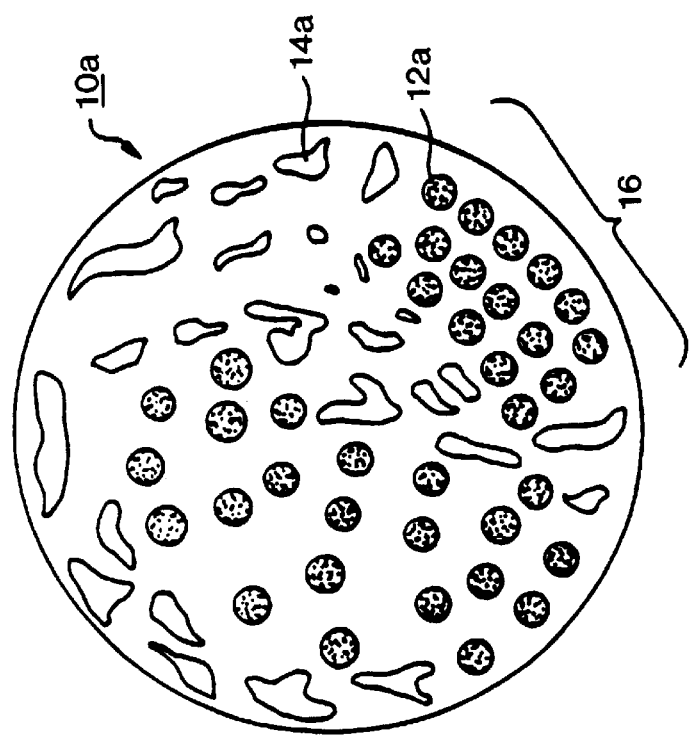
FIG. 1 is an enlarged, partial schematic cross-sectional representation of one embodiment of a fiber which may be incorporated in the present invention.

As is illustrated in FIGS. 1 and 2, the preferred fibers 10a, 10b incorporated into the materials of the present invention comprise filaments of, for example, glass, quartz, ceramic, carbon, polyether ether ketone, polyamide, polyimide, or polyphenylene sulfide 12a, 12b and filaments of PTFE 14a, 14b. The filaments 12, 14 are commingled together to form a cohesive composite thread.

It should be understood that as the term "fiber" is applied herein, it is intended to encompass any strand of composite material made in accordance with the present invention, regardless of application. This is intended to include, without limitation, instances where it is employed as a single thread, as multiple threads braided or otherwise combined together, as a woven fabric or as a nonwoven felt comprising a woven scrim.

As is explained in detail below, by varying the parameters used to combine the fiberglass and PTFE filaments, a number of different forms of commingled fibers can be achieved. For example, FIG. 1 shows a fiber 10a wherein clusters 16 of fiberglass filaments 12a tend to remain oriented together, with the PTFE filaments 14a essentially encapsulating the clusters 16. By contrast, the fiber 10b of FIG. 2 has a far more homogenous mix of fiberglass filaments 12b and PTFE filaments 14b, with the fiberglass filaments 12b oriented randomly or fairly evenly throughout the PTFE.

To create the fiber 10, basically the filaments of PTFE are spread apart into an open lattice and the filaments of fiberglass are then inserted and enclosed within the lattice. Preferably, before or during the insertion process, the fiberglass filaments are bulked, fragmented, and "texturized" into the PTFE lattice.

The process of commingling the fibers is preferably accomplished through use of air-jet texturing apparatus. As is known, textured yarns are those which have been given notably greater apparent volume than a correlational yarn of similar fiber (filament) count and linear density. This is normally accomplished by distorting the shape and/or orientation of the fibers and then setting the fiber (usually through some application of heat) in the distorted orientation. Common procedures in this regard are twisting, heating, crimping, and air jetting.

Figure 3:
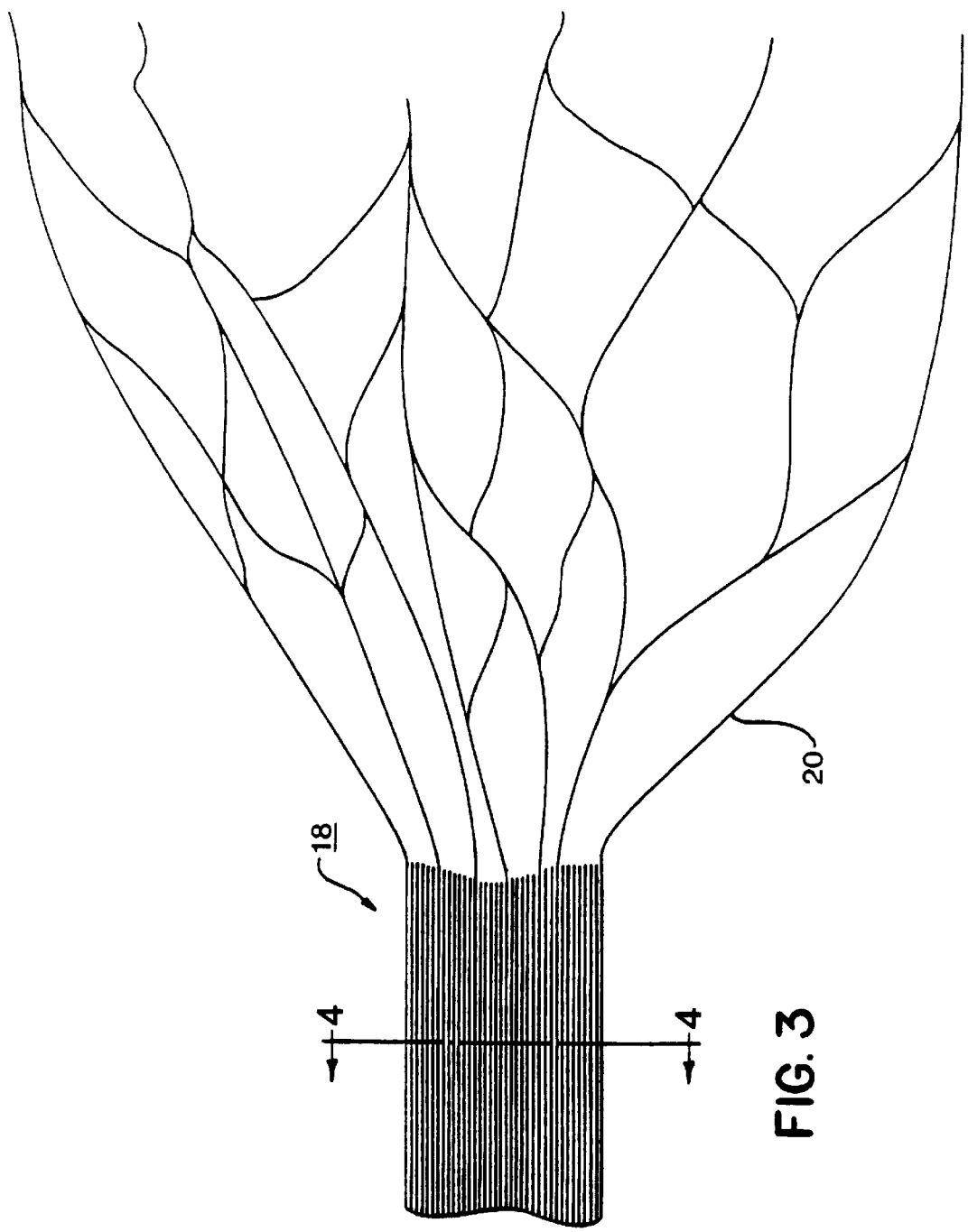
FIG. 3 is an enlarged plan view of a conventional tow yarn formed from expanded polytetrafluoroethylene (PTFE), with its filaments shown in partially exploded orientation.

The processing of the fibers may be better understood by referring to the drawings of FIGS. 3–6. An expanded PTFE polymer is used in the processing. Such a product can be produced in a known manner, such as in accordance with the teachings of U.S. Pat. No. 3,953,566, to Gore. Ideally, a slit film is created which is then passed over a series of ripper elements (e.g. a pin wheel) in a known manner to form a tow yarn 18. A representation of such a yarn is shown in FIG. 3.

Figure 4:
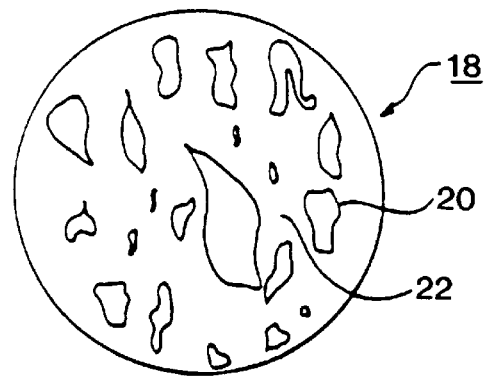
FIG. 4 is a cross-sectional view taken along line 4—4 of FIG. 3.

As is shown in FIG. 3, when created in this manner, the tow yarn 18 can be easily separated to reveal a lattice structure of long randomly interconnected filaments 20 of expanded PTFE. As is shown in FIG. 4, in un-exploded orientation, these filaments 20 are positioned within the PTFE tow yarn defining open spaces 22 between them.

Figure 5:
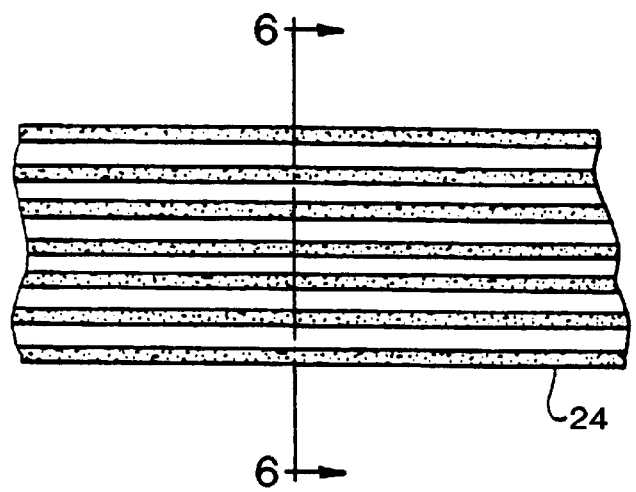
FIG. 5 is a partial schematic representation of a plan view of conventional fiberglass yarn.
Figure 6:
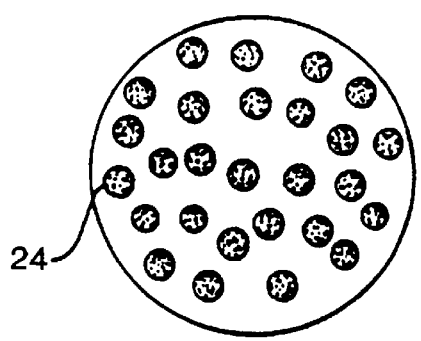
FIG. 6 is a cross-sectional view taken along line 6—6 of FIG. 5.

On the other hand, as is shown in FIGS. 5 and 6, the fiberglass filaments 24 are generally arranged in essentially a parallel or spiral arrangement. When subjected to an air-jet texturing apparatus, some of these filaments normally become fragmented into shorter strands.

The fiberglass or other heat resistant and/or chemical resistant material and PTFE can be mixed in various proportions to impart different properties to the composite filament. Generally, the composite fiber should contain 10 to 75% by weight of PTFE and 25 to 90% by weight of fiberglass. These proportions are a function of the mechanical properties required for a given application, with relatively more PTFE included to provide greater flex fatigue and abrasion resistance. For most applications, proportions of 25 to 50% by weight of PTFE and 50 to 75% by weight fiberglass are preferred.

In addition, for some applications it may be desirable to include one or more fillers to provide additional or enhanced properties for the composite fiber. Appropriate fillers include conductive fillers, such as graphite, carbon black or metal oxide, to produce an electrically conductive fiber; metal oxide or organic pigments to create colors for aesthetic or other reasons; and/or thermoplastic thermoset resins to create structural composites. Such fillers can be coated onto the composite fiber and/or incorporated into the PTFE fiber itself, such as through procedures similar to those disclosed in U.S. Pat. No. 4,985,296, to Mortimer, Jr.

Preferably, woven textile components are woven on conventional weaving looms to produce a woven fabric. The resulting textile can be scoured with a surfactant and water solution or heat cleaned using a high temperature bake cycle to remove any residual sizing. Additional chemical finishes can then be applied to the textile to impart chemical resistance or other desired properties.

Figure 7:
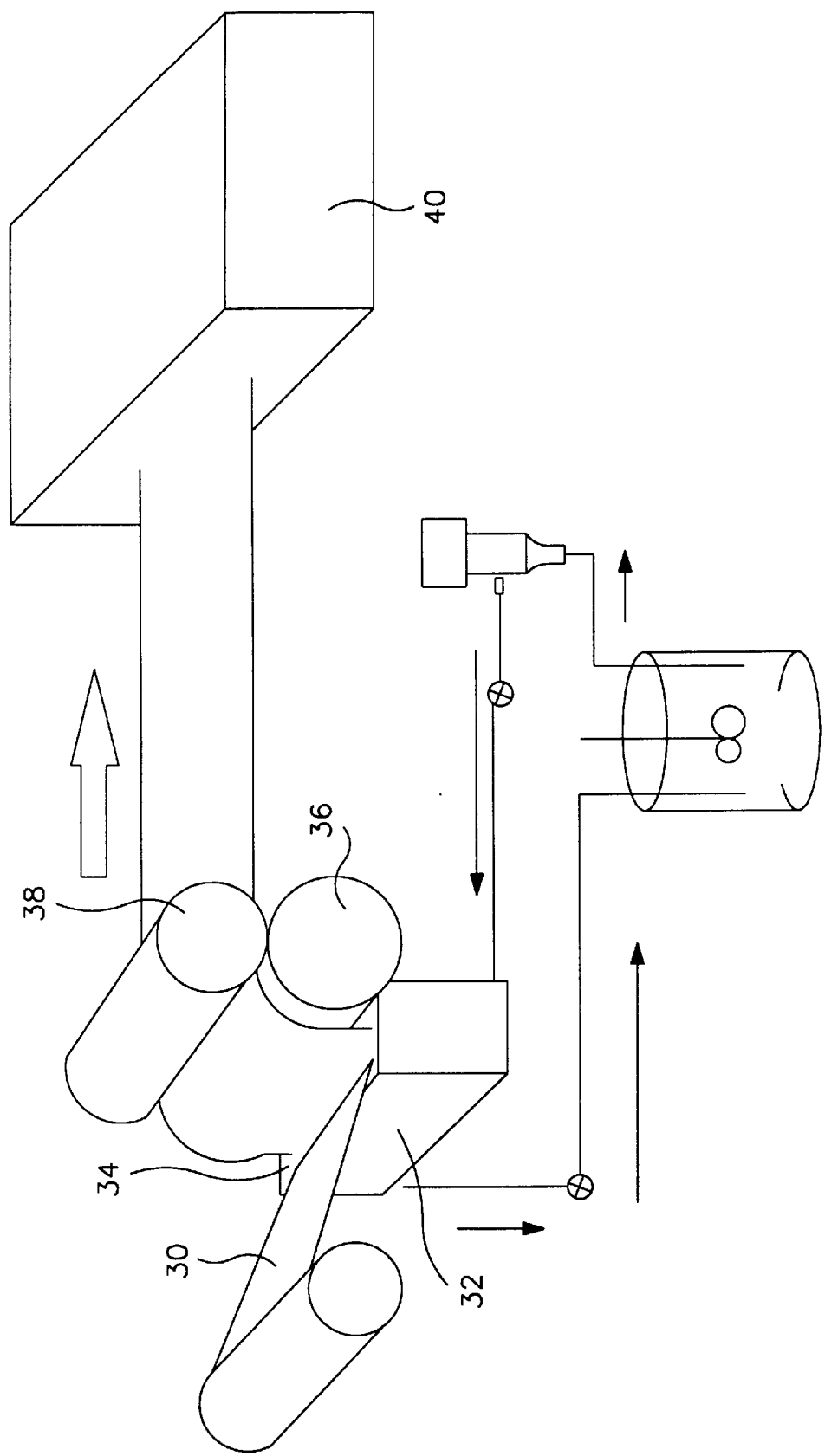
FIG. 7 is schematic drawing of the process equipment used to produce the composite material (B-stage)
Figure 8:
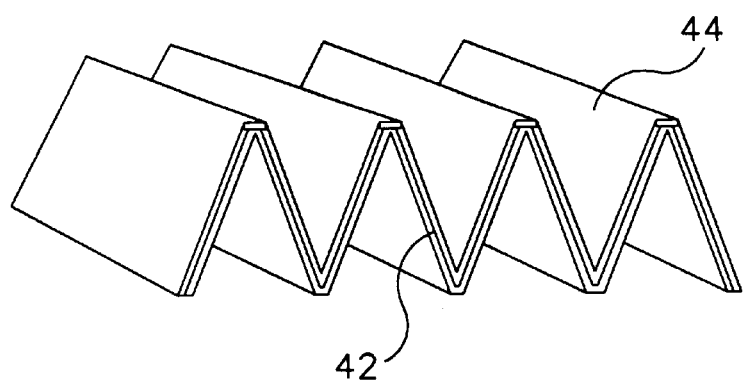
FIG. 8 is the composite material laminated with expanded PTFE, pleated and cured in the final heating step (C-stage)

The composite material is prepared by immersion coating of the woven or nonwoven textile with a phenolic resin or epoxy resin solution using equipment such as that shown in FIG. 7. The fabric 30 is fed into the coating tank 32 and dip coated in the resin solution 34. The material passes between two steel nip rolls 36, 38 to remove excess coating and enters a drying oven 40 where preferably at least about 90% of the solvent from the phenolic or epoxy solution is removed and the remaining thermosetting resin is partially cured, or "B-staged." The solvent is typically methanol or methylethyl ketone. FIG. 8 shows a cross-section of the fabric 42 after lamination with expanded PTFE membrane 44, followed by pleating and then final curing, or "C-staging," the pleated packs in a curing oven.

Pleating may be carried out using any suitable pleating equipment, such as a blade or push bar pleater. Suitable pleat depths which may be incorporated in the novel pleated composites the present invention are those sizes of at least 0.25 inch, and preferably of about 0.50 inch to 6 inches in pleat depth.

Figure 9:
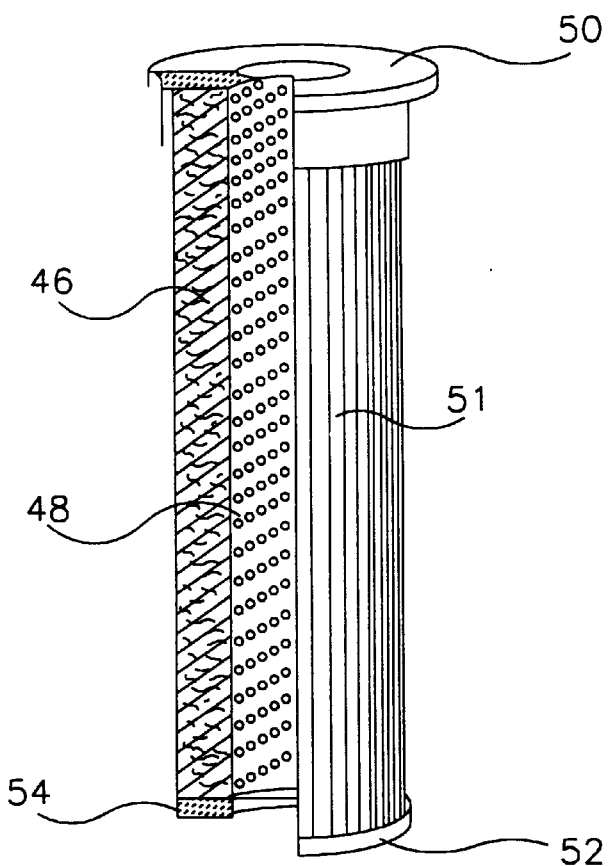
FIG. 9 is a cut-away cross-sectional view of a pleated filter cartridge in accordance with the present invention.

To form a cartridge filter of the present invention, the cured pleated filter pack 51 is formed into a cylindrical configuration, as shown in FIG. 9, and the last pleat is joined to the first pleat along a seam 46, shown in cut-away cross-section, the pleats being adhered together using an RTV silicone adhesive. The pleated filter pack 51 is then placed around a perforated, cylindrical supporting member or tube 48. This center tube or core 48 may be an expanded or perforated tube. The tube material may be carbon steel, galvanized or stainless steel, aluminum or any other suitable heat and/or chemical resistant material. In some cases, the center tube or core 48 may be a permanent fixture of the filtration device and thus, can be separated from the pleated filter pack. The pleated filter pack is potted into a metal end-caps 50, 52 fabricated from carbon steel, galvanized steel, stainless steel, aluminum or any other suitable heat and/or chemical resistant material. The potting material 54 may be a heat and/or chemical resistant silicone, epoxy or ceramic material. This potting material is dispensed as a viscous liquid, and after dispensing the potting material, the pleated filter pack is set into the potting and hardened to form an air-tight seal between the end-cap and the pleated filter pack.

An optional gasket may be attached to the top of one or both end-caps to seal the filter cartridge in the dust collector. The gasket may comprise heat resistant and/or chemical resistant materials such as silicone, fluorosilicone, or other fluoroelastomers, such as expanded PTFE. In the case of filter cartridges which are used to replace filter bags, the gasket seal may be provided by a felt snap-band, such as that taught in U.S. Pat. No. 5,536,290 to Stark et al.

Without intending to limit the scope of the present invention, the nature and operation of the present invention can be better understood when considered in light of the following examples.

EXAMPLE 1

An improved pleated composite material of the present invention was prepared starting with an 8 inch by 10 inch sample of 10 oz./yd$^2$ woven fabric, woven by BFG Industries, Inc. (Greensboro, N.C.). The woven fabric contained composite fibers of fiberglass (PPG, Inc. Pittsburgh, Pa.) and expanded PTFE (W. L. Gore and Associates, Inc.), the composite fibers being made in accordance with U.S. Pat. No. 5,456,983, to Sassa. The fabric was woven with fiberglass/expanded PTFE composite yarns running in both the warp and filling directions. The weave type was a 3×1 right hand twill with a 44×30 yarn count (warp×fill).

A liquid phenolic resin, sold as Durite LV-7339, from Borden, Inc. (Columbus. Ohio), was applied to the fabric by immersing the woven fabric in a mixture containing 20% solids (by weight) of methanol and phenolic resin. The sample was heated to 250° F. for 5 minutes, removing about 95% of the methanol, to form a B-stage structural fabric.

The B-stage structural fabric was laminated with an expanded PTFE membrane using a hot roll laminator at a temperature of 410° F., running at a speed of 50 feet per minute and a pressure of 25 psi. The laminate was then heated to 338° F. for 15 minutes to cure the phenolic resin to the C-stage. The air permeability of the C-stage laminate was 5.5 cfm/ft$^2$ at a differential pressure of 0.5 inch water gauge.

The laminated, B-stage structural fabric was pleated on a 40 inch wide blade pleater. The material was pre-heated to 200° F. as it passed over a pre-heat platen. The pleat height was 1 inch. After pleating, the material passed between an upper and lower heating platen at 280° F. After exiting the heated platens, the pleated material was pushed against a back-pressure bar to hold the pleats in place as they cooled to ambient temperature. The pleated material was cut into individual filter packs, each containing 50 pleats. The pleated laminate was then heated to 338° F. for 15 minutes to cure the phenolic resin (C-stage). The air permeability of the C-stage pleated laminate was 5.5 cfm/ft$^2$ at a differential pressure of 0.5 inch water gauge.

EXAMPLE 2

Flex fatigue properties of samples in unpleated form were tested to compare samples containing expanded PTFE and fiberglass composite yarns, one set in the warp direction only and one set in both the warp and fill directions, with a sample made from all fiberglass yarns.

The tests were conducted on a standard Tinius Olsen MIT Fold Endurance Test machine. Test parameters were as follows: modified double fold jaws (0.125 inch left and 0.0625 inch right, radius jaw tips), 3.5 lb. total loading, 180 double fold cycles per minute. A cycle is one complete stroke which includes a forward and return movement. The number of cycles at sample failure was recorded. In most cases the test was ended after the sample exceeded 1 million cycles even if the sample had not failed.

Test samples A–B were 100% fiberglass (PPG, Inc. Pittsburgh, Pa.) woven by BFG Industries, Inc. (Greensboro, N.C.) with the weave parameters listed in the Table The same phenolic coating procedure as that described in Example 1 was used to impregnate the fiberglass samples. Test samples C—D were prepared in accordance with the procedure set forth in Example 1. Test samples E–F were formed substantially as set forth in Example 1, except that the composite fibers were present only in the fill direction and the warp direction contained 100% fiberglass fibers (PPG, Inc. Pittsburgh, Pa.). The test samples were die cut from the C-stage structural fabric samples. Dimensions of the test samples were ½ inch wide by 5 inches long. Three samples were cut from the warp direction and three samples were cut from the filling direction from each C-stage structural fabric sample. The test results show that the inclusion of expanded PTFE and fiberglass composite yarns in the composite textile significantly increases the number of flex cycles until failure. In the case where the composite fibers were running only in the filling direction, the performance improvement was only achieved when the flex test was run perpendicular to the yarns in the filling direction. When the same tests are run in the warp direction, the structural fabric responds more like the all-fiberglass fabric.

In the case of pleated filter cartridges, the folds are perpendicular to the warp direction; therefore, it is important that the composite yarns run in the warp direction. The service life of the cartridge may be further increased if the composite yarns run in both the warp and filling directions.

| Sample | Warp Yarn Type | Fill Yarn Type | Flex Test Direction | M.I.T Flex Cycles |
|---|---|---|---|---|
| C-stage Structural Fabric M.I.T. Flex Testing of Fiberglass Composite | | | | |
| A | fiberglass ECDE 37 1/0 Tex | fiberglass ECDE 75 1/3 | warp | 7348 (F) 9712 (F) 7840 (F) |
| B | fiberglass ECDE 37 1/0 Tex | fiberglass ECDE 75 1/3 | fill | 2425 (F) 3701 (F) 6428 (F) |
| C-stage Structural Fabric M.I.T. Flex Testing of PTFE/Fiberglass Composite | | | | |
| C | PTFE + fiberglass | PTFE + fiberglass | | 1018025 (E) |

-continued

| Sample | Warp Yarn Type | Fill Yarn Type | Flex Test Direction | M.I.T Flex Cycles |
|---|---|---|---|---|
| D | ECDE 75 1/0 + 600 denier PTFE | ECDE 75 2/0 + 600 denier PTFE | warp | 1116967 (F) 1004822 (E) 1071207 (E) |
|  | PTFE + fiberglass ECDE 75 1/0 + 600 denier PTFE | PTFE + fiberglass ECDE 75 2/0 + 600 denier PTFE | fill | 1090654 (E) 1118756 (E) |
| C-stage Structural Fabric M.I.T. Flex Testing of PTFE/Fiberglass Composite |
| E | fiberglass ECDE 37 1/0 Tex 1200 denier PTFE | PTFE + fiberglass ECDE 75 2/0 + | warp | 25535 (F) 18658 (F) 31438 (F) |
| F | fiberglass ECDE 37 1/0 Tex 1200 denier PTFE | PTFE + fiberglass ECDE 75 2/0 + | fill | 1281227 (F) 1037805 (F) 1210150 (F) |

(E) = END TEST
(F) = FAIL

The invention claimed is:

1. A composite material which comprises
   a woven textile comprising multiple woven strands, said textile having a warp direction and a fill direction, wherein at least a portion of the strands running parallel to both the warp direction and the fill direction comprise multiple filaments of polytetrafluoroethylene (PTFE) and multiple filaments of high temperature chemical resistant material which form a single strand of commingled filaments; and a resin material selected from the group consisting of epoxy resin and phenolic resin impregnated within at least a portion of the woven textile,
   wherein at least a portion of said material is pleated.

2. The composite material of claim 1 wherein the PTFE comprises an expanded PTFE.

3. The composite material of claim 2 wherein the multiple filaments of expanded PTFE comprise a tow yarn.

4. The composite material of claim 3 wherein the high temperature and chemical resistant filaments comprise partially fragmented filaments textured into the tow yarn.

5. The composite material of claim 3 wherein the composite material can withstand repeated double folds without failure.

6. The composite material of claim 1 wherein at least a portion of the multiple woven strands comprise 10 to 75% by weight PTFE filaments.

7. The filter material of claim 6 wherein the strand comprises 25 to 90% by weight glass, quartz, ceramic, carbon, polyether ether ketone, polyamide, polyimide, or polyphenylene sulfide filaments.

8. The composite material of claim 1 wherein the strand further includes a filler.

9. The composite material of claim 1, further comprising an expanded PTFE membrane attached to said material.

10. The composite material of claim 8 wherein the material can withstand repeated double folds without tearing.

11. The composite material of claim 1, wherein the pleat width of the material is greater than 0.25 inch.

12. The composite material of claim 11, wherein the pleat width of the material is between 0.5 inch and 6 inches.

13. The composite material of claim 1 in the form of a pleated cartridge filter.

* * * * *